United States Patent [19]
Fox et al.

[11] 3,872,909
[45] Mar. 25, 1975

[54] METHOD OF DESALINATING SALT WATER

[75] Inventors: Michael R. Fox; Earl S. Grimmett, both of Idaho Falls, Idaho

[73] Assignee: The United States of America as represented by the United States Atomic Energy Commission, Washington, D.C.

[22] Filed: Jan. 10, 1972

[21] Appl. No.: 216,420

[52] U.S. Cl.................. 159/47, 23/303, 203/10
[51] Int. Cl............................................ B01d 1/00
[58] Field of Search ............ 159/47, 45, 2; 23/303, 23/11; 165/111; 203/10

[56] References Cited
UNITED STATES PATENTS

| | | |
|---|---|---|
| 3,344,042 | 9/1967 | Hardesty............................ 203/11 |
| 3,361,647 | 1/1968 | Brown................................. 203/11 |
| 3,361,648 | 1/1968 | Brown................................. 159/45 |
| 3,402,753 | 9/1968 | Thomas.............................. 159/47 R |
| 3,491,822 | 1/1970 | Ramaswami..................... 159/48 R |
| 3,697,234 | 10/1972 | Bonilla................................ 23/303 |

Primary Examiner—Norman Yudkoff
Assistant Examiner—Hiram H. Bernstein
Attorney, Agent, or Firm—John A. Horan; Arthur A. Churm; Frank H. Jackson

[57] ABSTRACT

Sea water is desalinated in a fluidized bed of salt particles operated at a high pressure at above the critical temperature of water.

2 Claims, 1 Drawing Figure

PATENTED MAR 25 1975          3,872,909
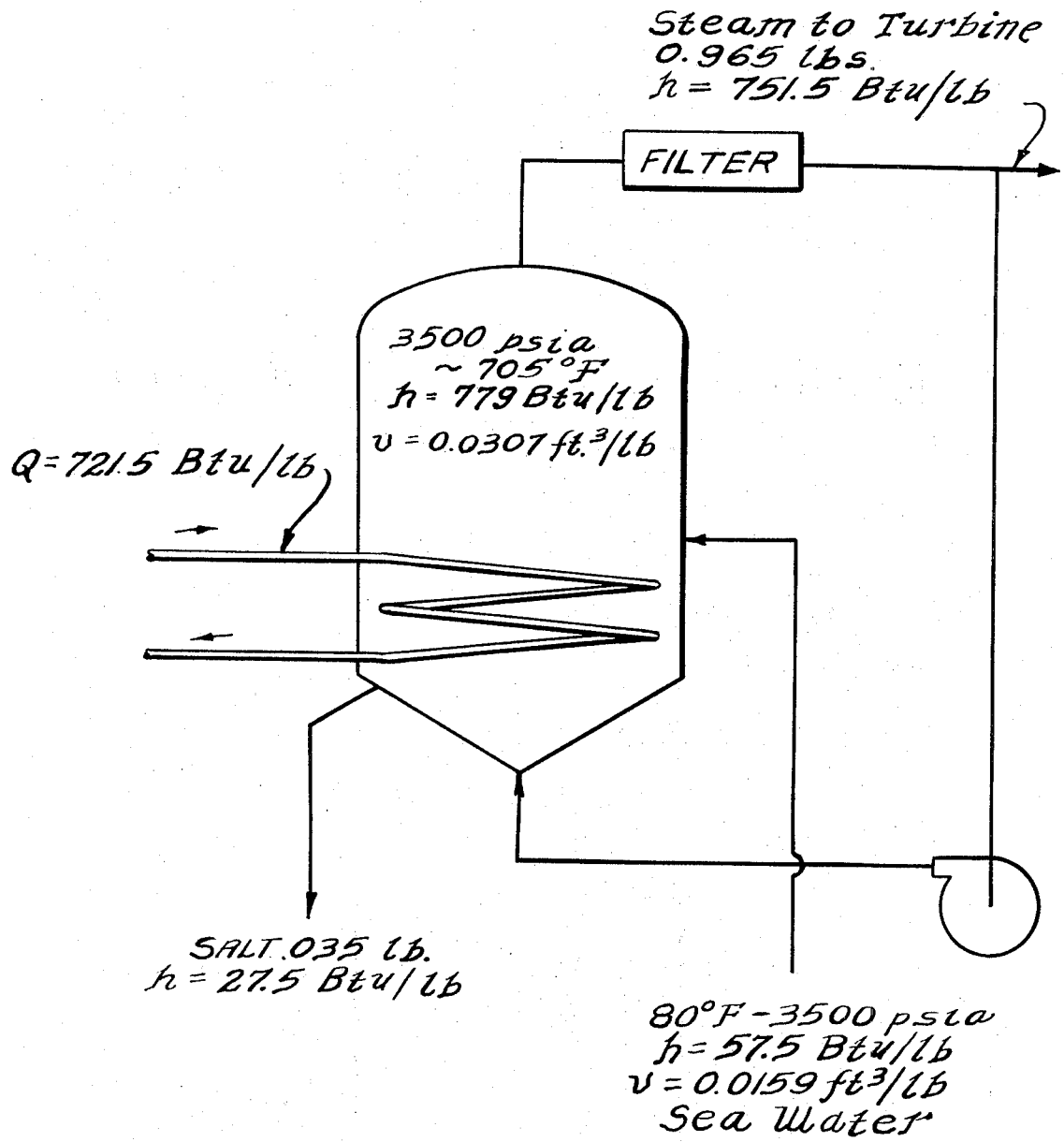

METHOD OF DESALINATING SALT WATER

CONTRACTUAL ORIGIN OF THE INVENTION

The invention described herein was made in the course of, or under, a contract with the U.S. Atomic energy commission.

BACKGROUND OF THE INVENTION

This invention relates to the conversion of salt water to fresh water. In more detail, the invention relates to the desalination of sea water in a fluidized bed with greatly improved efficiency.

A great deal of effort is presently being expended throughout the world on the development of new supplies of fresh water for municipal, industrial and agricultural use. A major portion of this effort has been expended on the desalination of sea water and every possible avenue is being explored in the hope that economically feasible procedures can be developed. One procedure that has been suggested is the evaporation of sea water in a fluidized bed and U.S. Pat. No. 3,491,822 describes such a procedure wherein sea water is atomized with steam before introducing it into a bed of salt particles fluidized with separate steam. By this procedure formation of a continuous liquid phase in the fluidized bed is avoided whereby scaling in the equipment is minimized. Likewise, no brine is present to cause corrosion and pollution, because all the sea water is converted to fresh water. While the patented process is technically feasible, the efficiency of the process is not high enough to obtain low cost water.

SUMMARY OF THE INVENTION

According to the present invention the efficiency of operation of a fluid-bed desalinator is greatly improved by operating the desalinator at high pressure at above the critical temperature of water. To attain the benefits of the present invention, the pressure must be above about 1000 psia (pounds per square inch absolute) and preferably should be above the critical pressure of water. At temperatures above the critical temperature, liquid water cannot exist in the fluidized bed no matter how high the pressure and problems from caking of the bed do not arise. Likewise, all of the heat put into the bed goes to evaporate the brine and there is no need to put in extra heat to ensure operability.

BRIEF DESCRIPTION OF THE DRAWING

The single FIGURE is a flow sheet of a preferred embodiment of this invention.

SPECIFIC EMBODIMENT OF THE INVENTION

According to the preferred embodiment, a fluidized bed formed of salt particles having a size range between about 0.3 and 0.6 mm is operated at 3500 psia and about 705°F. Any temperature from the critical temperature to about 1000°F. could be used. The heat input of 721.5 Btu/lb. may be from any heat source above 705°F. As shown, the steam taken off from the fluidized bed is filtered and a portion thereof recycled to the fluidized bed to fluidize the salt particles therein, the remainder being conducted to a turbine or being condensed as product water. Sea water at 80°F. having a heat content of 57.5 Btu/lb. is sprayed — or introduced directly — into the fluidized bed at 3500 psia. Since liquid water cannot exist at the temperature of operation, the rate of feed of sea water into the bed is not critical but may be adjusted to attain maximum output and efficiency. For every pound of sea water introduced into the bed, 0.965 pound of steam having a heat content of 751.5 Btu/lb. and 0.035 pound of salt having a heat content of 27.5 Btu/lb. are obtained. A portion of the salt particles are removed either continually or periodically and screened to remove particles that are too large or too small for efficient fluidization, only particles of the proper size being returned to the bed. Under these conditions a plant having a capacity of 1,000,000 pounds per hour (2,800,000 gallons per day) and having a superficial fluidizing velocity of 3 feet per second in the bed will require a vessel only 2 feet in diameter. A vessel operating at 50 psia with a fluidizing velocity of 3 feet per second would require a vessel 32 feet in diameter.

That this is true can be shown by a consideration of the effect on Reynolds number, Prandl number and thermal conductivity on operation at or above the critical pressure of steam (3208 psia). Since these factors increase as the pressure is increased, improved heat transfer can be expected and heat transfer correlations based on theory and experimental data indicate an increase in heat transfer coefficients greater than fivefold. In terms of a practical evaporator this means that the volume occupied by heat transfer surfaces will be reduced by a factor of 5. Fortunately, high-pressure operation means that the specific volume of steam is reduced markedly also. As shown in the flow sheet, the specific volume of steam at critical temperature and pressure is less than double the specific volume of water. Thus the reduction in volume required for heat transfer surface and hence vessel volume can be matched to the volume reduction possible because of the low specific volume of the steam. For a given feed throughput, a substantial reduction in equipment size is possible and hence a saving in capital cost is possible.

It will be appreciated that improved results are attained by operating at above the critical temperature in accordance with the present invention even though the pressure is below the critical pressure, although the increase in efficiency is not as great as at the higher pressures. These improved results occur at pressures above about 1000 psia, because all of the heat put into the bed goes to evaporate the brine and there is no need to put in extra heat to insure operability. Practically, the pressure used should be as high as the vessels can withstand.

We have observed that caking of a bed of salt particles which is fluidized with steam occurs when liquid water is present in the fluidized bed and also that the actual temperature at which liquid water appears in the bed is substantially above the condensation temperature of steam. Thus an additional amount of heat over the theoretical requirement is necessary merely to insure that the fluidized bed will not cake. The extra heat referred to here is known as "superheat" and is that heat over and above the heat required to raise the temperature of the water to the condensation temperature of steam required to maintain fluidization.

Tests were conducted at a pressure of 1.4 to 2.4 atmospheres. Although the condensation temperature of steam ranges from 231° to 264°F., the actual temperature at which liquid water appeared is about 30°F. higher (28° to 38°F.). The water was absorbed on the surface of the salt particles causing the bed to cake and the system to become inoperable. The aditional amount of heat required to maintain fluidization is an additional load on the system. Thus 5 Btu/lb. of heat in addition to the theoretical requirement is required for successful operation of a system operating at below critical temperature, which for a 100 million gallon per day plant would mean the additional heat requirement of $1.25 \times 10^{10}$ Btu/day.

The embodiments of the invention in which an exclusive property or privilege is claimed are defined as follows:

1. A method for desalinating salt water comprising establishing and maintaining a fluidized bed of salt particles at a pressure above the critical pressure of water by passing steam upwardly therethrough, heating the fluidized bed to above the critical temperature of water, introducing salt water into the bed and taking steam off from the fluidized bed.

2. A method according to claim 1 wherein the fluidized bed is formed of salt particles having a size range between about 0.3 and 0.6 mm and is operated at 3500 psia and about 705°F.

* * * * *